(12) United States Patent
Mitsui et al.

(10) Patent No.: US 7,371,899 B2
(45) Date of Patent: May 13, 2008

(54) METHOD FOR PRODUCING CARBONYL FLUORIDE

(75) Inventors: Yuuki Mitsui, Ichihara (JP); Koichi Yanase, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/763,483

(22) Filed: Jun. 15, 2007

(65) Prior Publication Data

US 2007/0249863 A1    Oct. 25, 2007

Related U.S. Application Data

(63) Continuation of application No. PCT/JP2005/023175, filed on Dec. 16, 2005.

(30) Foreign Application Priority Data

Dec. 16, 2004    (JP)    ............... 2004-364183

(51) Int. Cl.
*C07C 51/58*    (2006.01)
*C07C 53/38*    (2006.01)

(52) U.S. Cl. .............. 562/848; 562/849; 562/852

(58) Field of Classification Search ............. None
See application file for complete search history.

(56) References Cited

U.S. PATENT DOCUMENTS

2006/0194985 A1    8/2006    Mitsui et al.

2006/0229467 A1    10/2006    Mitsui
2007/0249863 A1    10/2007    Mitsui et al.

FOREIGN PATENT DOCUMENTS

| JP | 2000-26106 | 1/2000 |
|---|---|---|
| JP | 2002-158181 | 5/2002 |
| JP | 2003-212525 | 7/2003 |
| JP | 2003-267712 | 9/2003 |
| JP | 2004-277215 | 10/2004 |

OTHER PUBLICATIONS

George Brauer, Handbook of Preparative Inorganic Chemistry 1, 2nd ed., Acedemic Press, New York, 1965, pp. 206-209.
Von Otto Ruff, et al., Zeitschrift für Anorganische und Allgemeine Chemie, 242, 1939, pp. 272-276.
Von Shih-Chang Li, et al. "Journal of Chinese Chemical Society" vol. 11, No. 1, 14, 1944, pp. 14-24.
Chemical Abstract, vol. 39, 1945, p. 1099-1100.

*Primary Examiner*—Paul A. Zucker
(74) *Attorney, Agent, or Firm*—Oblon, Spivak, McClelland, Maier & Neustadt, P.C.

(57) ABSTRACT

To provide a method for producing carbonyl fluoride by employing carbon monoxide and fluorine as starting materials, without such a problem as vigorous heat generation or a decrease in the reaction yield due to a side reaction.

16 Claims, 2 Drawing Sheets

METHOD FOR PRODUCING CARBONYL FLUORIDE

BACKGROUND OF THE INVENTION

1. Technical Field

The present invention relates to a method for producing carbonyl fluoride.

2. Background Art

Carbonyl fluoride ($COF_2$) is used as a cleaning gas or etching gas for e.g. an apparatus for producing semiconductors, or as a starting material or a fluorinating agent for organic compounds. In such an application, particularly in an application as a cleaning gas for an apparatus for producing semiconductors, highly-pure carbonyl fluoride is desired.

As one of syntheses for carbonyl fluoride, a method of mixing carbon monoxide gas and fluorine gas in a gas phase to react them, is heretofore known (Non-Patent Document 1).

However, the above method had problems such as a danger of explosion, a decrease in the reaction yield of carbonyl fluoride due to a side reaction and vigorous heat generation. Now, such problems will be described in detail.

First, when carbon monoxide and fluorine are used as starting materials, the heat of formation of carbonyl fluoride is remarkably high. Further, the direct fluorination reaction of carbon monoxide using fluorine proceeds at an extremely high speed even at a normal temperature. Accordingly, unless such a heat of reaction is sufficiently removed, the temperature of carbonyl fluoride produced will increase.

Carbonyl fluoride will be decomposed to tetrafluoro methane and carbon dioxide at 300° C. or higher (Non-Patent Documents 2 to 4). Accordingly, unless the heat of reaction is sufficiently removed, it is considered that tetrafluoro methane and carbon dioxide will be produced as by-products.

Carbon dioxide and carbonyl fluoride have close molecular diameters, whereby it is difficult to separate them by adsorption. Further, both of them are readily reacted with an alkaline substance, and therefore, it is also impossible to separate them by neutralization. Furthermore, both of them have close boiling points, and therefore, it is also difficult to separate them by distillation (Patent Document 1). Accordingly, in order to obtain highly-pure carbonyl fluoride, it is extremely important to suppress production of carbon dioxide as a by-product by means of heat removal at the time of the reaction.

On the other hand, for the purpose of solving the above problems, Patent Document 2 proposes a method for producing carbonyl difluoride, characterized in that, when carbonyl difluoride is continuously produced by the reaction of carbon monoxide with fluorine gas, at least one of the third component gases selected from the group consisting of $N_2$, He, Ne and Ar is added, and the reaction is carried out while the gas is flown under dynamic conditions and under reduced pressure.

Patent Document 1: JP-A-2003-212525
Patent Document 2: JP-A-2003-267712
Non-Patent Document 1: Handbook of preparative inorganic chemistry I, 206 2nd ed., Georg Brauer, ed., Academic Press, New York, 1965
Non-Patent Document 2: Ruff; Li, Z. Anorg. Allg. Chem., 242 (1939), 272
Non-Patent Document 3: Li, J. chin, Chem. Soc., 11 (1944), 14
Non-Patent Document 4: Chem. Abstr., (1945), 1099

DISCLOSURE OF THE INVENTION

Problems to be Solved by the Invention

In the method disclosed in Patent Document 2, dilution is carried out with the third component gas selected from $N_2$, He, Ne and Ar, but a gas usually has a low heat transfer coefficient and low heat removal efficiency, and therefore, depending upon e.g. a reaction apparatus or reaction conditions (for example, in a case of continuously producing carbonyl fluoride in a larger quantity), heat removal is not sufficiently carried out and the reaction yield of carbonyl fluoride becomes low, and further, carbon dioxide will be formed by a side reaction as an impurity which is difficult to separate off and it becomes difficult to separate it from carbonyl fluoride.

In order to solve such problems, it may be conceivable to adopt a method of employing a reaction apparatus suitable for heat removal of the high temperature gas, such as an apparatus which has a relatively large boundary area (heat transfer area) between the reaction space and the cooling medium, to the volume of the reaction space, or a method of controlling the amount to be reacted to control the heat of reaction. However, such a method has a problem such that the cost of the apparatus becomes high relative to the production volume, and therefore is disadvantageous for industrial mass production.

Thus, a method for industrially producing carbonyl fluoride from carbon monoxide and fluorine as starting materials, has not yet been established.

Accordingly, it is an object of the present invention to provide a method for producing carbonyl fluoride from carbon monoxide and fluorine as starting materials, without such a problem as vigorous heat generation or a decrease in the reaction yield due to a side reaction.

MEANS TO SOLVE THE PROBLEMS

The present inventors have conducted extensive studies, and as a result, have found that it is possible to efficiently carry out heat removal by contacting carbon monoxide gas and fluorine gas in a liquid thereby letting them react with each other, whereby it is possible to obtain carbonyl fluoride in high yield. The present invention has been accomplished on the basis of such a discovery.

Namely, the present invention provides the following (1) to (9).

(1) A method for producing carbonyl fluoride, which comprises introducing carbon monoxide gas and fluorine gas into a liquid, and letting carbon monoxide and fluorine react with each other to obtain carbonyl fluoride.

(2) A method for producing carbonyl fluoride, which comprises contacting carbon monoxide gas and fluorine gas in a liquid thereby letting them react with each other to obtain carbonyl fluoride.

(3) The method for producing carbonyl fluoride according to the above (1) or (2), wherein one or both of the above carbon monoxide gas and the above fluorine gas are not substantially dissolved in the above liquid.

(4) The method for producing carbonyl fluoride according to the above (3), wherein both of the above carbon monoxide gas and the above fluorine gas are not substantially dissolved in the above liquid, and further both of the above carbon monoxide gas and the above fluorine gas are dispersed in the form of gas bubbles in the above liquid, followed by letting the above gas bubbles collide with each other to let both gases contact with each other.

(5) The method for producing carbonyl fluoride according to the above (3) or (4), wherein the above liquid is a fluorine-containing compound having no C—H bonds and having C—F bonds.

(6) The method for producing carbonyl fluoride according to the above (1) or (2), wherein the above liquid is a compound which produces carbonyl fluoride when reacted with fluorine.

(7) The method for producing carbonyl fluoride according to the above (6), wherein the above compound which produces carbonyl fluoride when reacted with fluorine, is a compound having a —CF(CF$_3$)COF group at a terminal.

(8) The method for producing carbonyl fluoride according to the above (7), wherein the above compound which produces carbonyl fluoride when reacted with fluorine, is a compound represented by C$_2$F$_5$[CF$_2$OCF(CF$_3$)]$_n$COF (wherein n is an integer of from 1 to 4).

(9) The method for producing carbonyl fluoride according to any one of the above (1) to (8), wherein one or both of the above carbon monoxide gas and the above fluorine gas are diluted with at least one diluent gas selected from the group consisting of carbonyl fluoride gas, nitrogen gas, helium gas, neon gas and argon gas.

EFFECTS OF THE INVENTION

According to the method for producing carbonyl fluoride of the present invention, it is possible to efficiently produce highly-pure carbonyl fluoride by using carbon monoxide and fluorine as starting materials, without such a problem as vigorous heat generation or a decrease in the reaction yield due to a side reaction.

Figure 1:
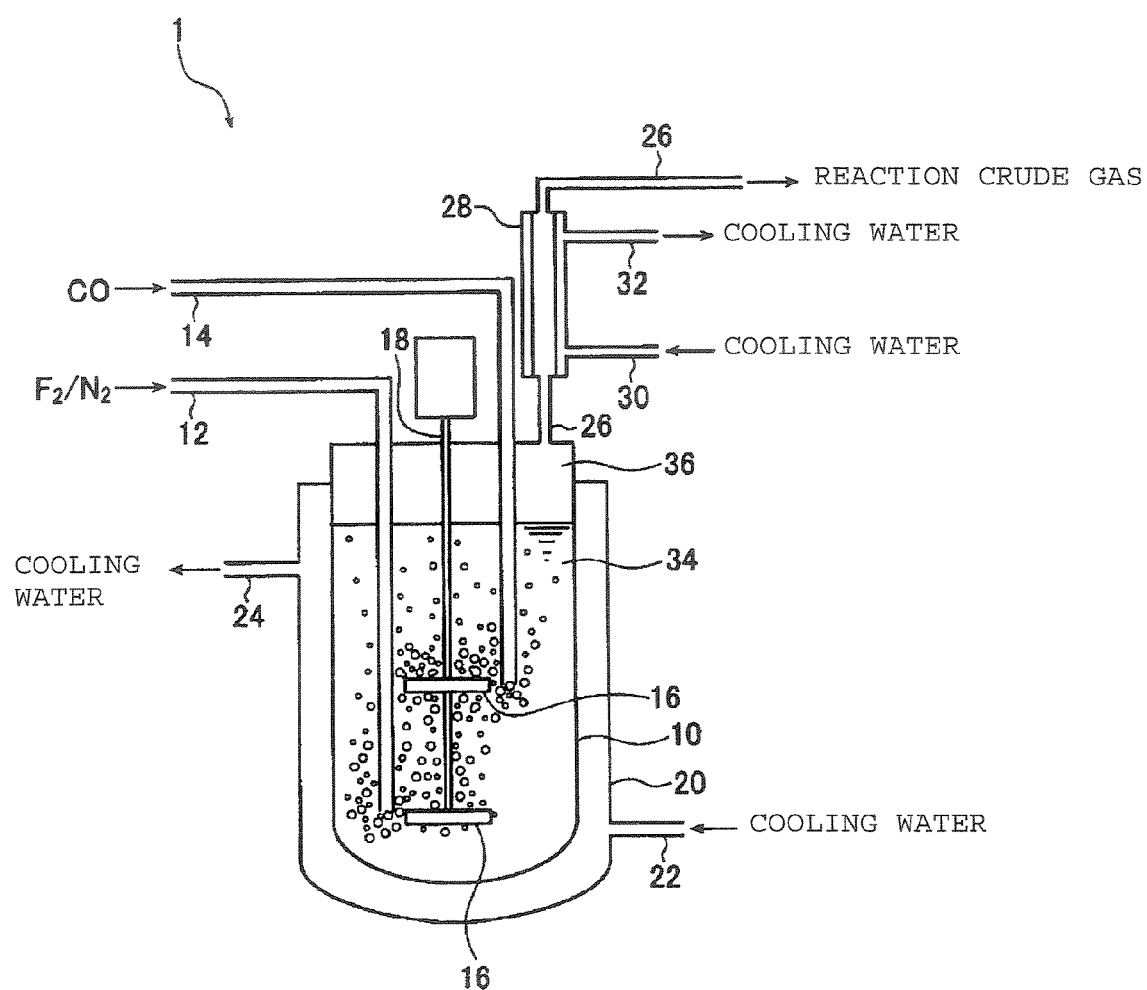
FIG. 1 is a schematic view showing an apparatus for producing carbonyl fluoride.

EXPLANATION OF REFERENCE NUMERALS 1, 2 Apparatus for producing carbonyl fluoride
10 Reactor
12 First inserted pipe
14 Second inserted pipe
16 Stirring vane
18 Stirrer
20, 56 Cooling jacket
22, 58 Cooling-water supply pipe
24, 60 Cooling-water discharge pipe
26, 62 Gas discharge pipe
28 Double-pipe heat exchanger
30 Cooling-water supply pipe
32 Cooling-water discharge pipe
34 Liquid
36 Upper space in reactor
50 Gas-phase reactor
52 First gas introduction pipe
54 Second gas introduction pipe

BEST MODE FOR CARRYING OUT THE INVENTION

Now, the present invention will be described in detail.
In the method for producing carbonyl fluoride of the present invention, carbon monoxide gas and fluorine gas are introduced into a liquid, and carbon monoxide and fluorine are reacted in the liquid to obtain carbonyl fluoride. Further, carbon monoxide gas and fluorine gas are contacted in a liquid thereby letting them react with each other to obtain carbonyl fluoride.

As the carbon monoxide gas to be used in the present invention, carbon monoxide gas may be used as it is, or it may be used as diluted with a diluent gas. Thus, by using carbon monoxide gas as diluted, it is possible to lower the reaction rate and suppress the side reaction.

The carbon monoxide gas is preferably one with high purity, and specifically, one with a parity of preferably at least 99.5 vol %, particularly preferably at least 99.9 vol %. Accordingly, if impurities are contained in a large amount in the carbon monoxide gas as a starting material, it is preferred to separate and remove the impurities by purification treatment.

However, if the impurities are ones which do not substantially affect the reaction and ones which can be readily purified and separated from carbonyl fluoride as the desired product, the impurities may not be lowered to the above range.

Types of the impurities which will be contained in the carbon monoxide gas vary depending upon the production method. For example, when the carbon monoxide gas is produced by a steam cracking method, carbon dioxide is produced as an impurity. In such a case, it is possible to remove carbon dioxide by contacting produced carbon monoxide gas with an alkali such as soda lime, followed by dehydration with e.g. a silica gel.

The fluorine gas to be used in the present invention is fluorine (F$_2$) as a simple substance, and fluorine gas may be used as it is, but may preferably be used as diluted with a diluent gas. Thus, by using the fluorine gas as diluted, it is possible to lower the reaction rate properly and suppress a side reaction. Further, it is possible to effectively prevent a reaction of the fluorine gas with the after-mentioned liquid. Such dilution is carried out to bring the fluorine gas concentration to preferably at most 80 vol %, more preferably at most 60 vol %.

Further, similarly to the carbon monoxide gas, the fluorine gas is also preferably one with high purity, and specifically, one with a purity of at least 99.0 vol %, particularly preferably at least 99.5 vol %. Accordingly, when impurities are contained in a large amount in the fluorine gas as a starting material, it is preferred to separate and remove the impurities by purification treatment.

A diluent gas for diluting one or both of the carbon monoxide gas and the fluorine gas, is preferably at least one member selected from the group consisting of carbonyl fluoride gas, nitrogen gas, helium gas, neon gas and argon gas.

When the diluent gas is carbonyl fluoride, it is possible to omit a step of removing a diluent gas from carbonyl fluoride produced. Further, in a case where the diluent gas is at least one member selected from the group consisting of nitrogen gas, helium gas, neon gas and argon gas, the difference in the boiling point between carbonyl fluoride and the diluent gas becomes large, whereby separation by distillation will be easy.

In the present invention, the reaction is carried out by contacting carbonyl monoxide gas and fluorine gas in a liquid. Accordingly, the heat of formation of carbonyl fluoride generated by the reaction of the carbon monoxide gas and the fluorine gas can efficiently be removed by the liquid, whereby it is possible to produce carbonyl fluoride without such a problem as vigorous heat generation or a decrease in the reaction yield due to a side reaction.

In one of the preferred embodiments, the liquid to be used in the present invention is a substance which is not substantially reactive with the fluorine gas. If the fluorine gas is consumed by the reaction with the liquid, the yield of carbonyl fluoride lowers, and further, a large quantity of the heat of reaction is likely to be generated, such being undesirable.

The substance which is not substantially reactive with the fluorine gas may, for example, be a fluorine-containing compound having no C—H bonds and having C—F bonds. Particularly, a perfluoroalkane (for example, Fluorinert FC-72 manufactured by 3M), a perfluoro ether (for example, Fluorinert FC-75 and FC-77 manufactured by 3M), a perfluoro polyether (for example, Krytox manufactured by Du Pont, Fomblin and Galden manufactured by Ausimont Inc., Demnum manufactured by Daikin Industries, Ltd.), a perfluoroester, a chlorofluorocarbon, a chlorofluoro polyether, a perfluoroalkylamine (for example, perfluorotrialkylamine) or an inert fluid (for example, various types of Fluorinert manufactured by 3M) may, for example, be mentioned. Further, it is also possible to use compounds represented by $C_2F_5[CF_2OCF(CF_3)]_mCF_2OC_2F_5$ (wherein m is an integer of from 1 to 4), and among them, $C_3F_7OCF(CF_3)CF_2OC_2F_5$ is preferred.

Further, an organic solvent may also be mentioned, which is obtainable by perfluororizing a known organic solvent having at least one atom selected from the group consisting of a chlorine atom, a nitrogen atom and an oxygen atom in the structure.

Such liquids may be used alone or two or more of them may be used in combination.

The liquid is more preferably a substance which produces carbonyl fluoride when reacted with fluorine gas.

Further, as mentioned above, the liquid to be used in the present invention is preferably a substance which is not substantially reactive with fluorine gas. However, when the above liquid is one which produces carbonyl fluoride when reacted with fluorine gas, such a liquid is suitably used. In such a case, the substance produced by the reaction is carbonyl fluoride, whereby the purity of the carbonyl fluoride obtainable is not lowered.

The compound which produces carbonyl fluoride when reacted with fluorine gas is preferably a compound having a —CF ($CF_3$) COF group at a terminal, more preferably a fluorine-containing compound having no C—H bonds. For example, a compound represented by $C_2F_5[CF_2OCF(CF_3)]_nCOF$ (wherein n is an integer of from 1 to 4) is preferred, and particularly, a perfluorocarbonyl fluoride such as $C_3F_7OCF(CF_3)COF$ or $C_3F_7OCF(CF_3)CF_2OCF(CF_3)COF$ may be mentioned.

However, if the reaction rate of the above liquid and fluorine gas is too high, a problem of heat generation is likely to occur, whereby the reaction rate is preferably at most 0.4 mol %, particularly preferably at most 0.2 mol %.

Further, it is preferred that the liquid to be used in the present invention does not substantially permit carbonyl fluoride to dissolve therein. It is thereby possible to efficiently collect gaseous carbonyl fluoride produced.

Neither carbon monoxide gas nor fluorine gas may be dissolved in the liquid, or part or all of them may be dissolved therein. When neither of them is dissolved in the liquid, the reaction will be a gas phase reaction wherein both of them are contacted with each other in a gaseous state for the reaction, when one of them is not dissolved in the liquid and the other is dissolved therein, the reaction will be a reaction at a gas-liquid interface wherein they are contacted for the reaction in such a condition that one of them is in a gaseous state and the other is in a state as dissolved in the liquid, and when both of them are dissolved in the liquid, the reaction will be a liquid phase reaction wherein both of them are contacted for the reaction in the state as dissolved in the liquid. Such a gas phase reaction, a reaction at a gas-liquid interface and a liquid phase reaction may be carried out at the same time.

When neither carbon monoxide gas nor fluorine gas is substantially dissolved in the liquid, it is preferred that both gases are dispersed in the form of fine gas bubbles in the liquid, followed by letting the gas bubbles collide with each other to let both gases contact with each other for the reaction.

In the apparatus for the production of carbonyl fluoride as mentioned below, carbonyl fluoride produced is stored temporarily in a space in the reactor, but if unreacted carbon monoxide gas and fluorine gas are supplied to such a space, the heat of reaction tends to be insufficiently removed. Accordingly, it is preferred that the above reaction is substantially completed in the liquid.

As mentioned above, in the case where the carbon monoxide gas and fluorine gas are respectively dispersed in the form of gas bubbles in the liquid, followed by letting the gas bubbles collide with each other for the reaction, the reaction efficiency increases.

The smaller the size of gas bubbles is, the smaller the heat of reaction due to collision of the respective gas bubbles becomes, whereby the heat removal will be facilitated, such being preferred. A method for making gas bubbles smaller may, for example, be a method of supplying the starting material gases into the liquid by using a blowing pipe; a method of letting the starting material gases pass through e.g. a sintered filter, a gas permeable film or a gas-liquid mixer; or a method of using a stirring apparatus for mixing the liquid in the reactor.

Further, in order that the above reaction is substantially completed in the liquid, it is preferred to set the reaction conditions or the apparatus so that the residence time of gas bubbles in the liquid will be prolonged.

When neither carbon monoxide gas nor fluorine gas is substantially dissolved in the liquid, it is theoretically preferred that the ratio in the amount (molar ratio) of carbon monoxide gas to fluorine gas to be mixed is 1:1, but practically it is necessary to take an error in the flow rate control into consideration, and it is preferred to adjust the ratio to be from 1.01:1 to 1.05:1 in order not to let unreacted fluorine gas remain.

Further, in the case where one or both of carbon monoxide gas and fluorine gas are dissolved in the liquid, a method for increasing the efficiency in dissolution may be a method of mixing the above gas bubbles and the liquid by using an apparatus such as a blowing nozzle which makes gas bubbles small. The method of mixing the gas bubbles and the liquid may, for example, be a method of using a stirring apparatus for mixing the liquid in the reactor or a method of circulating the liquid by a circulation line and a pump.

The temperature of the liquid is not particularly limited so long as it is not higher than the boiling point, but if the temperature is low, the reaction will be slow, whereby unreacted carbon monoxide gas and fluorine gas are likely to react in a gas-phase in a space in the reactor. Therefore, the temperature is preferably from −50 to 250° C., more preferably from −30 to 230° C., furthermore preferably from −10 to 200° C. In order to adjust the temperature of the liquid to the above range, it is preferred to carry out cooling.

As a method of cooling, it is possible to employ a known means such as a cooling jacket.

The reaction pressure may suitably be determined by taking into consideration e.g. the dissolution of the starting material gases in the liquid, the gas bubble diameter in a case where gas bubbles are present in the liquid or the residence time of gas bubbles in the liquid, but it is usually preferably from 0 to 1 MPa, more preferably from 0 to 0.8 MPa, furthermore preferably from 0 to 0.5 MPa, as gauge pressure. As the pressure becomes high, the solubility of the starting material gases in the liquid will be high, the gas bubbles will be small, and the residence time of the gas bubbles in the liquid will be prolonged.

The process for producing carbonyl fluoride of the present invention may be carried out in a batch system or a continuous system. In the case of a continuous system, it is possible to suitably employ a method of blowing the starting material gases into a reactor charged with the liquid, or a method of blowing the starting material gases into the liquid which is circulated by a circulation line and a pump.

It is preferred that carbonyl fluoride obtained as mentioned above is purified so as to achieve high purity by removing by-products or remove diluent gas when carbonyl fluoride is diluted with the diluent gas. A method of the purification is not particularly limited, and a conventional method may, for example, be employed. Particularly, distillation is preferred.

Now, a preferred embodiment of the method for producing carbonyl fluoride of the present invention will be described with reference to drawings attached.

FIG. 1 is a schematic view showing an apparatus for producing carbonyl fluoride. The apparatus 1 for producing carbonyl fluoride, shown in FIG. 1, basically comprises a reactor 10, a first inserted pipe 12 and a second inserted pipe 14 for supplying gases to the reactor 10, a stirrer 18 provided with stirring vanes 16 for stirring the content in the reactor 10, a cooling jacket 20 for cooling the reactor 10, a cooling-water supply pipe 22 for supplying cooling water (which may be a cooling medium, the same applies hereinafter) to the cooling jacket 20, a cooling-water discharge pipe 24 for discharging cooling water from the cooling jacket 20, a gas discharge pipe 26 for discharging gas from the reactor 10, a double-pipe heat exchanger 28 provided at a midway point of the gas discharge pipe 26, a cooling-water supply pipe 30 for supplying cooling water to the double-pipe heat exchanger 28 and a cooling-water discharge pipe 32 for discharging cooling water from the double-pipe heat exchanger 28.

Firstly, reactor 10 is preferably deaerated, and then the liquid 34 is charged thereinto.

Then the liquid 34 is vigorously stirred by rotating the stirring vanes 16 of the stirrer 18 by a motor. At the same time, cooling water is supplied from the cooling-water supply pipe 22 to cooling jacket 20, and discharged from the cooling-water discharge pipe 24.

Under the above conditions, firstly, a diluent gas for diluting fluorine gas is supplied to reactor 10 from the first inserted pipe 12, and the pressure in reactor 10 is controlled. Then, while the diluent gas is supplied, fluorine gas is further supplied to the reactor 10 from the first inserted pipe 12. Then, carbon monoxide gas is rapidly supplied to the reactor 10 from the second inserted pipe 14. Thus, in the liquid 34, gas bubbles of fluorine gas supplied from the first inserted pipe 12 and gas bubbles of carbon monoxide gas supplied from the second inserted pipe 14 will collide with each other to produce a reacted gas.

The reacted gas produced and gases which are not used in the reaction (hereinafter both of them are generally referred to as "reaction crude gas") are stored temporarily in an upper space 36 in the reactor 10, then discharged through the gas discharge pipe 26, and then cooled by the double-pipe heat exchanger 28 provided at a midway point of the gas discharge pipe 26. To the double-pipe heat exchanger 28, cooling water is supplied from the cooling-water supply pipe 30 and discharged from the cooling-water discharge pipe 32.

Finally, the reaction crude gas obtained is purified by a distillation apparatus (not shown) to obtain highly-pure carbonyl fluoride.

In the method for producing carbonyl fluoride of the present invention, heat removal is efficiently carried out by the liquid, whereby it is possible to produce a large amount of carbonyl fluoride without such a problem as a danger of explosion, a decrease in the reaction yield due to a side reaction or vigorous heat generation.

Carbonyl fluoride to be produced by the present invention is not particularly limited in its use, but may, for example, be suitably used as a cleaning gas or etching gas for e.g. an apparatus for producing semiconductors, or as a starting material or a fluorinating agent for organic compounds. Especially, because of its high purity, it is suitably used particularly for the application as a cleaning gas for an apparatus for producing semiconductors.

EXAMPLES

Now, the present invention will be described in detail with reference to Examples, but it should be understood that the present invention is by no means restricted thereto.

1. Production of Carbonyl Fluoride

Example 1

By using the apparatus for producing carbonyl fluoride as shown in FIG. 1, carbonyl fluoride was produced as follows. In the apparatus 1 for producing carbonyl fluoride as shown in FIG. 1, the reactor 10 was made of stainless steel and had an inner diameter of 150 mm, a depth of 315 mm and an internal volume of about 5 L, and each of the first inserted pipe 12 and second inserted pipe 14 had an inner diameter of 6 mm.

Firstly, the reactor 10 was deaerated, and 7 kg of a liquid 34 of the compound (boiling point: 114° C.) represented by the chemical formula $C_3F_7OCF(CF_3)CF_2OCF(CF_3)COF$ was charged thereinto.

Then, the liquid 34 was vigorously stirred by rotating the stirring vanes 16 of the stirrer 18 at 600 rpm by a motor. At the same time, cooling water having a temperature of 17° C. was supplied to the cooling jacket 20 from the cooling-water supply pipe 22, and discharged from the cooling-water discharge pipe 24. The flow rate of cooling water was 400 L/hr.

Under the above conditions, firstly, nitrogen gas for diluting fluorine gas was supplied at a flow rate of 5,000 SCCM to the reactor 10 from the first inserted pipe 12, and the pressure in the reactor 10 was controlled to 0.09 MPa (gauge pressure). Then, while nitrogen gas was supplied, fluorine gas was further supplied at a flow rate of 1,000 SCCM to the reactor 10 from the first inserted pipe 12 (fluorine concentration: 16.7 vol %). Then, carbon monoxide gas was rapidly supplied at a flow rate of 1,000 SCCM to the reactor 10 from the second inserted pipe 14. Thus, in the liquid 34, gas bubbles of fluorine gas supplied from the first inserted pipe 12 and gas bubbles of carbon monoxide gas supplied from the second inserted pipe 14 collided with each other to produce a reacted gas.

The reaction crude gas was stored temporarily in an upper space 36 in the reactor 10, then discharged through the gas discharge pipe 26, and then cooled by the double-pipe heat exchanger 28 provided at a midway point of the gas discharge pipe 26. To the double-pipe heat exchanger 28, cooling water was supplied from the cooling-water supply pipe 30, and discharged from the cooling-water discharge pipe 32.

Thus, the reaction was continuously carried out for 60 minutes. At the time of completion of the reaction, the gas-phase temperature in the reactor 10 was 83° C., the temperature of the liquid 34 was 34° C., and a temperature of cooling water in the cooling-water discharge pipe 24 was 22° C.

The reaction crude gas discharged from the gas discharge pipe 26 via cooling by the double-pipe heat exchanger 28, was subjected to gas chromatography to analyze the composition.

As a result, the reaction rate of carbon monoxide gas was 100%, the selectivity for carbonyl fluoride gas was 97.3%, and the selectivity for carbon dioxide gas was 2.7%. Tetrafluoro methane was not detected. Here, the selectivity (by mol %) is represented by carbonyl fluoride/(carbonyl fluoride+carbon dioxide+tetrafluoro methane)×100.

Example 2

Carbonyl fluoride was produced in the same manner as in Example 1 except that the temperature of cooling water supplied to the cooling jacket 20 was −10° C., the flow rate of nitrogen gas for diluting fluorine gas was 3,360 SCCM, the pressure in the reactor 10 was 0.1 MPa (gauge pressure), the flow rate of fluorine gas was 2,000 SCCM (fluorine concentration: 37.3 vol %) and the flow rate of carbon monoxide gas was 2,000 SCCM.

At the time of completion of the reaction, the gas-phase temperature in the reactor 10 was 27.1° C., the temperature of the liquid 34 was 18.1° C., and the temperature of cooling water in the cooling-water discharge pipe 24 was −8° C.

The reaction crude gas discharged from the gas discharge pipe 26 via cooling by the double-pipe heat exchanger 28, was subjected to gas chromatography to analyze the composition.

As a result, the reaction rate of carbon monoxide gas was 100%, the selectivity for carbonyl fluoride gas was 99.0%, the selectivity for carbon dioxide gas was 0.9%, and the selectivity for tetrafluoro methane was 0.1%.

Example 3

Carbonyl fluoride was produced in the same manner as in Example 1 except that the temperature of cooling water supplied to the cooling jacket 20 was −10° C., the flow rate of carbonyl fluoride for diluting fluorine gas was 2,450 SCCM, the pressure in the reactor 10 was 0.1 MPa (gauge pressure), the flow rate of fluorine gas was 2,000 SCCM (fluorine concentration: 45 vol %) and the flow rate of carbon monoxide gas was 2,000 SCCM.

At the time of completion of the reaction, the gas-phase temperature of the reactor was 10 50° C., the temperature of the liquid 34 was 27° C., and the temperature of the cooling water in cooling-water discharge pipe 24 was −6° C.

The reaction crude gas discharged from the gas discharge pipe 26 via cooling by the double-pipe heat exchanger 28, was subjected to gas chromatography to analyze the composition.

As a result, the reaction rate of carbon monoxide gas was 100%, the selectivity for carbonyl fluoride gas was 99.89%, the selectivity for carbon dioxide gas was 0.08%, and the selectivity for tetrafluoro methane was 0.03%.

Example 4

Carbonyl fluoride was produced in the same manner as in Example 3 except that the liquid charged into the reactor was changed to 7.38 kg of $C_3F_7OCF(CF_3)CF_2OC_2F_5$.

At the time of completion of the reaction, the gas-phase temperature of the reactor 10 was 42.4° C., the temperature of the liquid 34 was 21.5° C., and the temperature of the cooling water in cooling-water discharge pipe 24 was −5° C.

The reaction crude gas discharged from the gas discharge pipe 26 via cooling by the double-pipe heat exchanger 28, was subjected to gas chromatography to analyze the composition.

As a result, the reaction rate of carbon monoxide gas was 100%, the selectivity of carbonyl fluoride gas was 99.9%, the selectivity of carbon dioxide gas was 0.09%, and the selectivity of tetrafluoro methane was 0.01%

Example 5

Carbonyl fluoride was produced in the same manner as in Example 3 except that the liquid charged into the reactor was changed to 8.0 kg of Fluorinert FC-77 manufactured by 3M.

At the time of completion of the reaction, the gas-phase temperature of the reactor 10 was 57.6° C., the temperature of the liquid 34 was 18.2° C., and the temperature of cooling water in the cooling-water discharge pipe 24 was −7° C.

The reaction crude gas discharged from the gas discharge pipe 26 via cooling by the double-pipe heat exchanger 28, was subjected to gas chromatography to is analyze the composition.

As a result, the reaction rate of carbon monoxide gas was 100%, the selectivity for carbonyl fluoride gas was 99.9%, the selectivity for carbon dioxide gas was 0.06%, and the limit of detection of tetrafluoro methane was 0.02%.

Comparative Example 1

Figure 2:
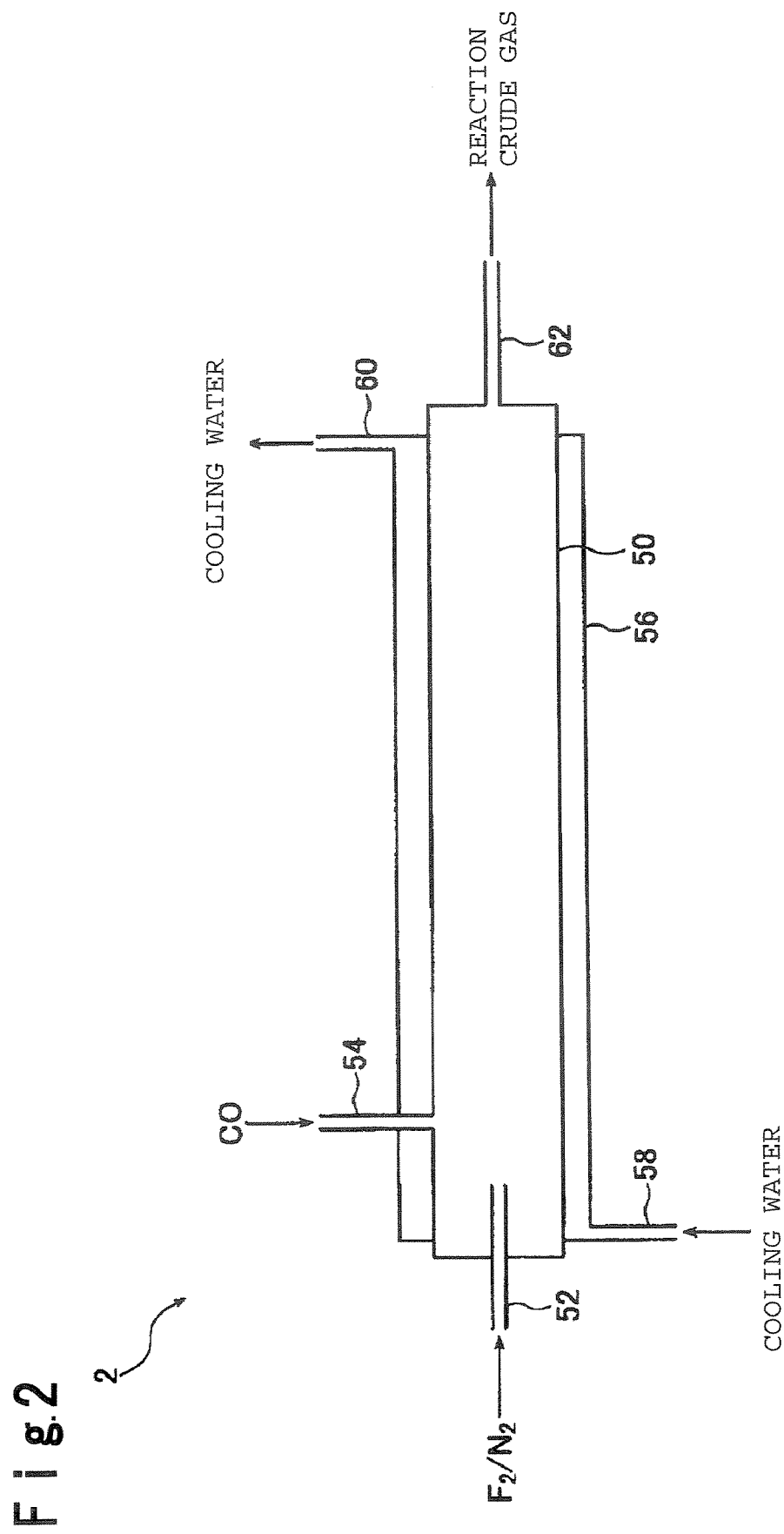
FIG. 2 is a schematic view showing another apparatus for producing carbonyl fluoride.

By using the apparatus for producing carbonyl fluoride as shown in FIG. 2, carbonyl fluoride was produced as follows.

FIG. 2 is a schematic view showing another apparatus for producing carbonyl fluoride. The apparatus 2 for producing carbonyl fluoride as shown in FIG. 2 basically comprises a gas-phase reactor 50 (made of stainless steel, inner diameter: 25 mm), a first gas introduction pipe 52 and second gas introduction pipe 54 (inner diameter: 10 mm each) for supplying gas to the gas-phase reactor 50, a cooling jacket 56 for cooling the gas-phase reactor 50, a cooling-water supply pipe 58 for supplying cooling water to the cooling jacket 56, a cooling-water discharge pipe 60 for discharging cooling water from the cooling jacket 56, and a gas discharge pipe 62 for discharging gas from the gas phase reactor 50.

Firstly, cooling water having a temperature of 17° C. was supplied to the cooling jacket 56 from the cooling-water supply pipe 58, and discharged from the cooling-water discharge pipe 60. The flow rate of cooling water was 400 L/hr.

Under the above conditions, firstly, nitrogen gas for diluting fluorine gas was supplied at a flow rate of 5,000 SCCM to the gas-phase reactor 50 from the first gas supply pipe 52, and the internal pressure of the gas-phase reactor 50 was controlled to 0.02 MPa (gauge pressure). Then, while the nitrogen gas was supplied, fluorine gas was further supplied at a flow rate of 1,000 SCCM to the gas-phase reactor 50 from the first gas supply pipe 52 (fluorine concentration: 16.7 vol %). Then, carbon monoxide gas was rapidly supplied at a flow rate of 1,000 SCCM to the gas-phase reactor 50 from the second gas supply pipe 54. Accordingly, in the gas-phase reactor 50, fluorine gas supplied from the first gas supply pipe 52 and carbon monoxide gas supplied from the second gas supply pipe 54 collided with each other to produce a reacted gas.

Thus, the reaction was continuously carried out for 60 minutes. At the time of completion of the reaction, the internal temperature of the gas-phase reactor 50 reached 400° C. at the highest, and the temperature of cooling water in the cooling-water discharge pipe 60 was 18° C.

The reaction crude gas discharged from the gas discharge pipe 60, was subjected to gas chromatography to analyze the composition.

As a result, the reaction rate of carbon monoxide is gas was 100%, the selectivity for carbonyl fluoride gas was 95.1%, the selectivity for carbon dioxide gas was 4.3%, and the selectivity for tetrafluoro methane was 0.6%.

As evident from the above results, according to the method for producing carbonyl fluoride of the present invention (Examples 1 to 3), it is possible to produce highly-pure carbonyl fluoride in a large amount, as compared with a case (Comparative Example 1) where carbon monoxide gas and fluorine gas are not contacted in liquid.

INDUSTRIAL APPLICABILITY

Highly-pure carbonyl fluoride which is obtainable in high yield according to the present invention, is suitably used in a wide range of fields, for example, as a cleaning gas or etching gas for e.g. an apparatus for producing semiconductors, or as a starting material or a fluorinating agent for organic compounds.

The entire disclosure of Japanese Patent Application No. 2004-364183 filed on Dec. 16, 2004 including specification, claims, drawings and summary is incorporated herein by reference in its entirety.

What is claimed is:

1. A method for producing carbonyl fluoride, which comprises introducing carbon monoxide gas and fluorine gas into a liquid, and letting carbon monoxide and fluorine react with each other to obtain carbonyl fluoride.

2. The method for producing carbonyl fluoride according to claim 1, wherein one or both of the above carbon monoxide gas and the above fluorine gas are not substantially dissolved in the above liquid.

3. The method for producing carbonyl fluoride according to claim 1, wherein both of the above carbon monoxide gas and the above fluorine gas are not substantially dissolved in the above liquid, and further both of the above carbon monoxide gas and the above fluorine gas are dispersed in the form of gas bubbles in the above liquid, followed by letting the above gas bubbles collide with each other to let both gases contact with each other.

4. The method for producing carbonyl fluoride according to claim 1, wherein the above liquid is a fluorine-containing compound having no C—H bonds and having C—F bonds.

5. The method for producing carbonyl fluoride according to claim 1, wherein the above liquid is a compound which produces carbonyl fluoride when reacted with fluorine.

6. The method for producing carbonyl fluoride according to claim 5, wherein the above compound which produces carbonyl fluoride when reacted with fluorine, is a compound having a —CF(CF$_3$)COF group at a terminal.

7. The method for producing carbonyl fluoride according to claim 6, wherein the above compound which produces carbonyl fluoride when reacted with fluorine, is a compound represented by C$_2$F$_5$[CF$_2$OCF(CF$_3$)]$_n$COF (wherein n is an integer of from 1 to 4).

8. The method for producing carbonyl fluoride according to claim 1, wherein one or both of the above carbon monoxide gas and the above fluorine gas are diluted with at least one diluent gas selected from the group consisting of carbonyl fluoride gas, nitrogen gas, helium gas, neon gas and argon gas.

9. A method for producing carbonyl fluoride, which comprises contacting carbon monoxide gas and fluorine gas in a liquid thereby letting them react with each other to obtain carbonyl fluoride.

10. The method for producing carbonyl fluoride according to claim 9, wherein one or both of the above carbon monoxide gas and the above fluorine gas are not substantially dissolved in the above liquid.

11. The method for producing carbonyl fluoride according to claim 9, wherein both of the above carbon monoxide gas and the above fluorine gas are not substantially dissolved in the above liquid, and further both of the above carbon monoxide gas and the above fluorine gas are dispersed in the form of gas bubbles in the above liquid, followed by letting the above gas bubbles collide with each other to let both gases contact with each other.

12. The method for producing carbonyl fluoride according to claim 9, wherein the above liquid is a fluorine-containing compound having no C—H bonds and having C—F bonds.

13. The method for producing carbonyl fluoride according to claim 9, wherein the above liquid is a compound which produces carbonyl fluoride when reacted with fluorine.

14. The method for producing carbonyl fluoride according to claim 13, wherein the above compound which produces carbonyl fluoride when reacted with fluorine, is a compound having a —CF(CF$_3$)COF group at a terminal.

15. The method for producing carbonyl fluoride according to claim 14, wherein the above compound which produces carbonyl fluoride when reacted with fluorine, is a compound represented by C$_2$F$_5$[CF$_2$OCF(CF$_3$)]$_n$COF (wherein n is an integer of from 1 to 4).

16. The method for producing carbonyl fluoride according to claim 9, wherein one or both of the above carbon monoxide gas and the above fluorine gas are diluted with at least one diluent gas selected from the group consisting of carbonyl fluoride gas, nitrogen gas, helium gas, neon gas and argon gas.

* * * * *